United States Patent
Carr et al.

(10) Patent No.: US 7,287,642 B1
(45) Date of Patent: Oct. 30, 2007

(54) TRIPPABLE IDLER ROLLER ASSEMBLY FOR BELT CONVEYORS

(75) Inventors: James L. Carr, Tupelo, MS (US); Charles C. Stanford, Pontotoc, MS (US); William B. Harwood, Guntown, MS (US); Thomas E. Hubbert, Saltillo, MS (US)

(73) Assignee: FMC Technologies, Inc., Houston, TX (US)

( * ) Notice: Subject to any disclaimer, the term of this patent is extended or adjusted under 35 U.S.C. 154(b) by 0 days.

(21) Appl. No.: 11/520,422

(22) Filed: Sep. 12, 2006

(51) Int. Cl.
    *B65G 21/00* (2006.01)
(52) U.S. Cl. .................. 198/861.1; 198/828; 198/830; 193/37
(58) Field of Classification Search ........ 198/824–826, 198/828, 830, 860.1, 861.1; 193/37, 35 B, 193/35 F
See application file for complete search history.

(56) References Cited

U.S. PATENT DOCUMENTS

| | | | | |
|---|---|---|---|---|
| 2,974,777 A | * | 3/1961 | Marsh .................... | 198/827 |
| 3,664,488 A | * | 5/1972 | Florian et al. ............. | 198/813 |
| 3,931,883 A | * | 1/1976 | Willard et al. ............. | 198/721 |
| 4,043,447 A | * | 8/1977 | Donnelly et al. .......... | 198/827 |
| 4,524,864 A | * | 6/1985 | Peterson, II ............... | 198/828 |
| 4,793,470 A | * | 12/1988 | Andersson .................. | 198/823 |
| 4,978,000 A | * | 12/1990 | Mohr .......................... | 198/641 |
| 5,645,158 A | * | 7/1997 | Polka et al. ................ | 198/812 |
| 5,657,857 A | * | 8/1997 | Neilson et al. .......... | 198/861.1 |
| 6,237,753 B1 | * | 5/2001 | Walter et al. ............... | 198/824 |
| 6,279,717 B1 | * | 8/2001 | Chen .................... | 193/35 MD |
| 6,516,942 B2 | * | 2/2003 | East ........................... | 198/830 |
| 6,942,085 B1 | * | 9/2005 | Tatz ......................... | 193/35 R |

* cited by examiner

*Primary Examiner*—Douglas A Hess
(74) *Attorney, Agent, or Firm*—Henry C. Query, Jr.

(57) ABSTRACT

An idler roller assembly comprises a base frame which includes first and second spaced-apart mounting brackets, a support frame which includes a support tube that comprises a first end which is positioned adjacent the first mounting bracket and a second end which is positioned adjacent the second mounting bracket, and a locking shaft assembly which includes a stationary sleeve which is secured to the first mounting bracket and a rotating sleeve which is rotatably supported by the stationary sleeve and is secured to the first end of the support tube. The stationary sleeve comprises a first contact surface and the rotating sleeve comprises a second contact surface, and the locking shaft assembly further includes a lock spool which comprises a first lock surface which conforms to the first contact surface and a second lock surface which conforms to the second contact surface. In addition, the lock spool is movable between a first position in which the first lock surface is engaged with the first contact surface and the second lock surface is engaged with the second contact surface to thereby prevent the rotating sleeve from rotating relative to the stationary sleeve, and a second position in which the first lock surface is engaged with the first contact surface but second lock surfaces is disengaged from the second contact surface to thereby allow the rotating sleeve to rotate relative to the stationary sleeve. Thus in the first position of the lock spool the support frame is prevented from pivoting relative to the base frame, and in the second position of the lock spool the support frame is allowed to pivot relative the base frame.

20 Claims, 8 Drawing Sheets

TRIPPABLE IDLER ROLLER ASSEMBLY FOR BELT CONVEYORS

BACKGROUND OF THE INVENTION

The present invention relates to an idler roller assembly. In particular, the invention relates to an idler roller assembly which includes a support frame that is connected to a base frame by a locking shaft assembly which operates to selectively allow the support frame to pivot relative to the base frame.

Prior art belt conveyors typically include a number of idler roller assemblies for supporting the upper run of an endless conveyor belt at various points along its length. These idler roller assemblies may include a number of idler rollers which are held in engagement with the conveyor belt by a fixed support frame. If these rollers seize up, friction between the conveyor belt and the idler rollers can damage the belt and possibly cause a fire. Thus, when a seized idler roller is detected, the problem should be fixed immediately. If the idler roller is mounted to a fixed support frame, however, the idler roller cannot be moved away from the belt and the conveyer usually needs to be stopped so that the idler roller can be replaced.

Some prior art idler roller assemblies include a pivoting support frame which allows the idler roller to be moved away from the conveyor belt so that it can be replaced without stopping the conveyor. For example, U.S. Pat. No. 5,567,857 discloses a pivotal idler frame assembly which comprises an idler support frame that is connected to a stationary conveyor frame by two elongated rods. By removing one of the rods, the idler support frame can be pivoted about the other rod in order to disengage the idler rollers from the conveyor belt. However, corrosion and buildup on the rods may cause the rods to become stuck, which makes quick disengagement of the rollers from the belt very difficult.

SUMMARY OF THE INVENTION

In accordance with the present invention, these and other limitations in the prior art are overcome by providing an idler roller assembly which comprises a base frame which includes first and second spaced-apart mounting brackets, a support frame which includes a support tube that comprises a first end which is positioned adjacent the first mounting bracket and a second end which is positioned adjacent the second mounting bracket, and a locking shaft assembly which includes a stationary sleeve which is secured to the first mounting bracket and a rotating sleeve which is rotatably supported by the stationary sleeve and is secured to the first end of the support tube. The stationary sleeve comprises one of a first contact surface and a second contact surface and the rotating sleeve comprises the other of the first contact surface and the second contact surface, and the locking shaft assembly further includes a lock spool which comprises a first lock surface which conforms to the first contact surface and a second lock surface which conforms to the second contact surface. In addition, the lock spool is movable between a first position in which the first lock surface is engaged with the first contact surface and the second lock surface is engaged with the second contact surface to thereby prevent the rotating sleeve from rotating relative to the stationary sleeve, and a second position in which the first lock surface is engaged with the first contact surface but second lock surfaces is disengaged from the second contact surface to thereby allow the rotating sleeve to rotate relative to the stationary sleeve. Thus, in the first position of the lock spool the support frame is prevented from pivoting relative to the base frame, and in the second position of the lock spool the support frame is allowed to pivot relative the base frame.

Furthermore, the idler roller assembly can be incorporated into a belt conveyor in such a manner that, when the lock spool is in its first position, the idler roller assembly is in an operative position in which a number of idler rollers mounted to the support frame are engaged with the conveyor belt. Moreover, when the lock spool is moved from its first to its second position, the idler roller assembly can be easily moved into an inoperative position in which the idler rollers are disengaged from the conveyor belt. Thus, if one or more of the idler rollers should fail or otherwise require servicing, the idler roller assembly will easily and conveniently allow the idler rollers to be disengaged from the conveyor belt.

These and other objects and advantages of the present invention will be made apparent from the following detailed description, with reference to the accompanying drawings. In the drawings, the same reference numbers are used to denote similar components in the various embodiments.

DETAILED DESCRIPTION OF THE INVENTION

The trippable idler roller assembly of the present invention is particularly useful in belt conveyor systems. For purposes of brevity, therefore, the following description will illustrate an exemplary embodiment of the invention which may be used in such a conveyor system. However, it should be understood that the present invention may have use in other types of conveyor systems, and that the individual novel features of the invention may have use in other applications as well. Therefore, the following description should not be construed to limit in any way either the present invention or its individual novel features.

Figures 1, 2:
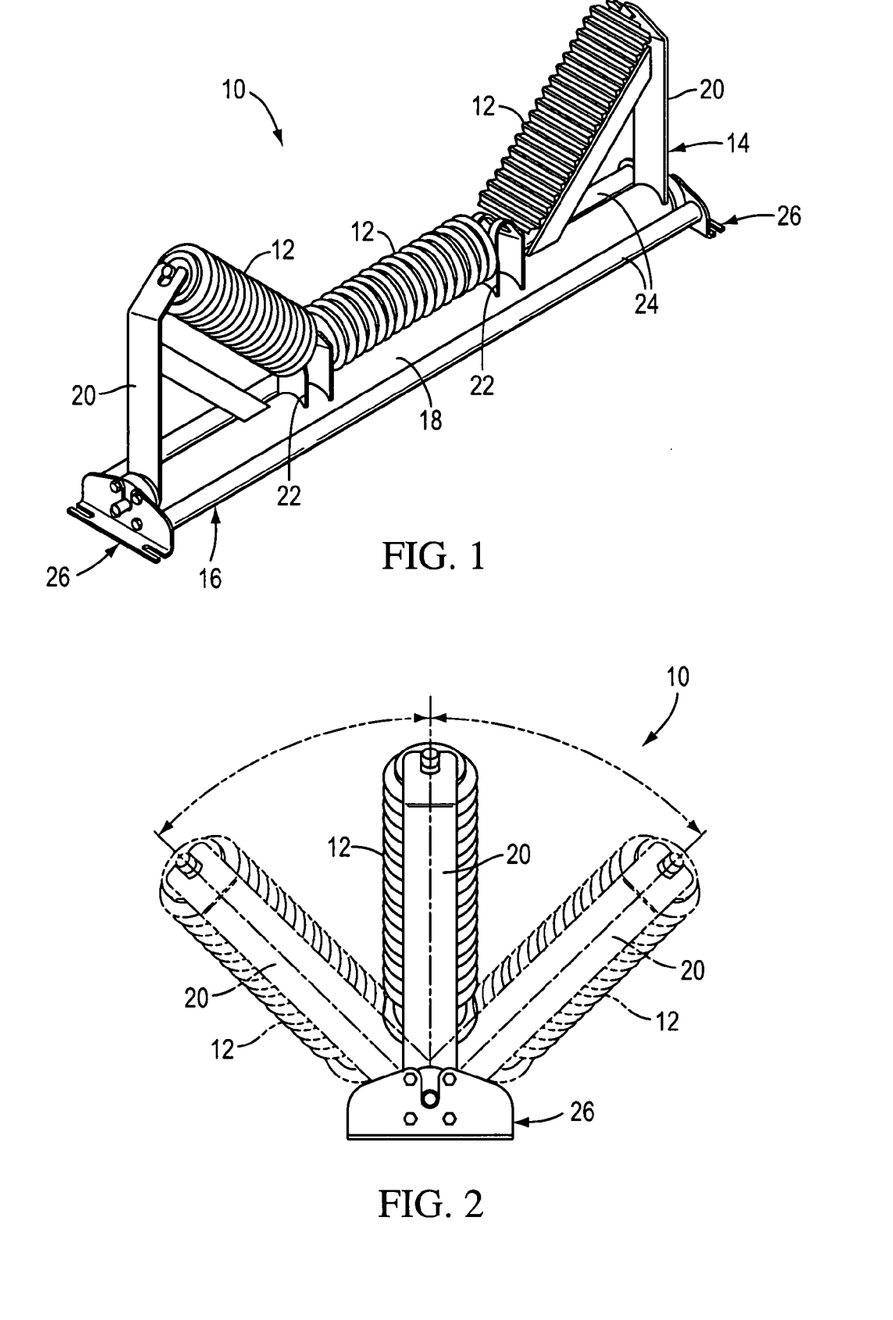
FIG. 1 is a perspective view of the idler roller assembly of the present invention.
FIG. 2 is a side elevation view of the idler roller assembly of FIG. 1, with the support frame component of the invention shown in phantom in its two inoperative positions.

Referring to FIGS. 1 and 2, the trippable idler roller assembly of the present invention, which is indicated generally by reference number 10, includes a number of idler rollers 12 which are secured to a support frame 14 that is pivotally connected to a base frame 16 by means which will be described below.

The base frame 16 is in turn connected to a support structure of a belt conveyor (not shown). In the operative position of the idler roller assembly 10, which is shown in FIG. 1 and in solid lines in FIG. 2, the support frame 14 maintains the idler rollers 12 in engagement with the underside of the top run of a conveyor belt (not shown). In the two inoperative positions of the idler roller assembly 10, which are shown in phantom in FIG. 2, the support frame 14 positions the idler rollers 12 away from the conveyor belt. Thus, if one or more of the idler rollers 12 should fail or otherwise require servicing, the trippable idler roller assembly 10 will allow the idler rollers to be moved out of engagement with the conveyor belt.

The exemplary idler roller assembly 10 is shown to comprise three idler rollers 12. The idler rollers 12 may comprise any known device which is suitable for use in a desired application. For example, the idler rollers 12 may comprise the particular idler roller described and illustrated in U.S. Pat. No. 6,516,942, which is hereby incorporated herein by reference.

Figure 3:
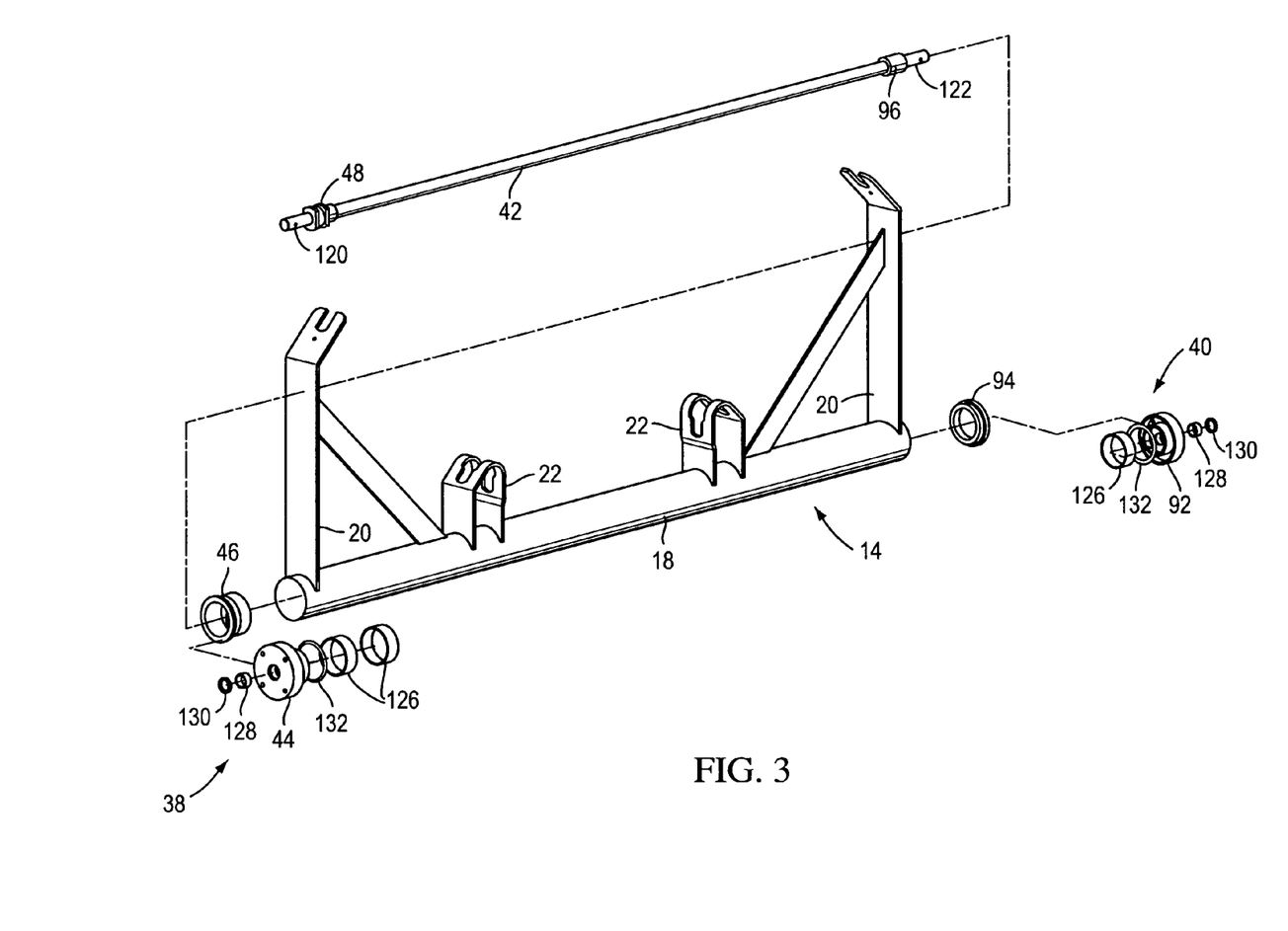
FIG. 3 is an exploded perspective view of the support frame and locking shaft assembly of the idler roller assembly of the present invention.
Figure 4:
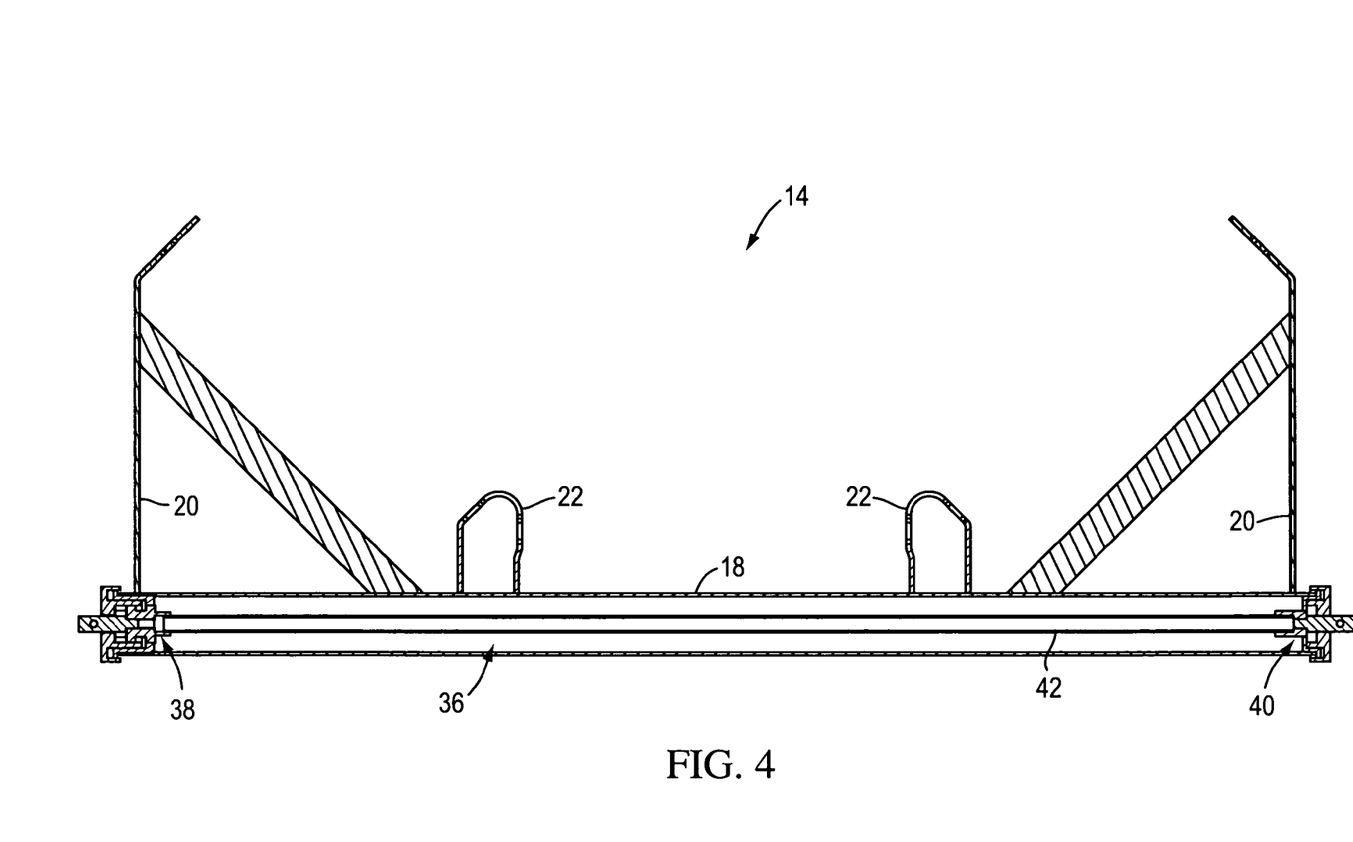
FIG. 4 is a longitudinal cross sectional view of the support frame and locking shaft assembly shown in FIG. 3.

Referring also to FIGS. 3 and 4, the support frame 14 includes an elongated support tube 18, a pair of end brackets 20 which are attached to opposite ends of the support tube, and a pair of center brackets 22 which are attached to the support tube inboard of the end brackets. As shown in FIG. 1, two of the idler rollers 12 are connected between corresponding ones of the end brackets 20 and the center brackets 22, and the remaining idler roller 12 is connected between the two center brackets. In addition, the end brackets 20 are designed to be taller than the center brackets 22 so that the idler rollers 12 will conform the conveyor belt to the shape of a trough.

Figure 5:
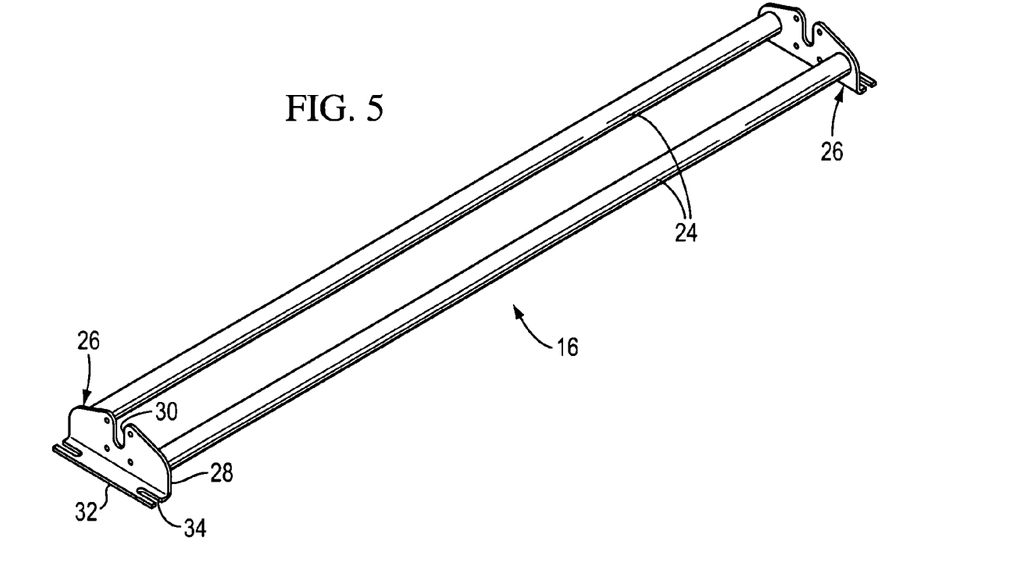
FIG. 5 is a perspective view of the base frame component of the idler roller assembly of the present invention.

As shown in FIG. 5, the base frame 16 includes at least one and preferably two elongated beams 24, each of which extends between a pair of mounting brackets 26. Each mounting bracket 26 comprises an upstanding part 28 which includes a vertical groove 30 and a horizontal part 32 which includes a number of apertures 34 through which corresponding bolts may extend in order to secure the base frame 16 to the support structure of the belt conveyor (not shown).

Referring again to FIG. 4, the support frame 14 is pivotally connected to the base frame 16 using a novel locking shaft assembly, which is indicated generally by reference number 36. The locking shaft assembly 36 includes a locking hub 38 which is positioned at one end of the support tube 18, a non-locking hub 40 which is positioned at the opposite end of the support tube, and a connecting rod 42 which extends between the locking and non-locking hubs.

Figure 6:
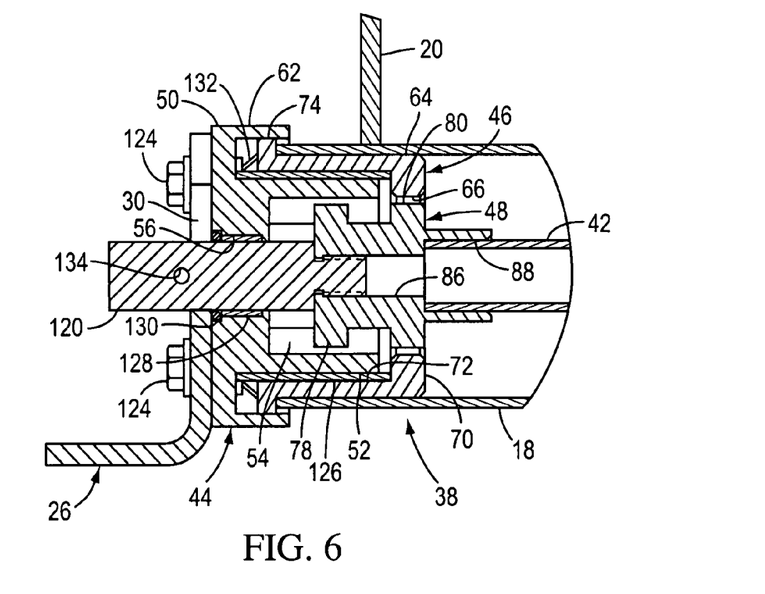
FIG. 6 is a cross sectional view of the locking hub component of the locking shaft assembly of the present invention shown in its locked position.

Referring to FIGS. 3 and 6, the locking hub 38 comprises a stationary sleeve 44 which is secured to the base frame 16, a rotating sleeve 46 which is secured to the support frame 14, and a lock spool 48 which is operatively disposed relative the stationary sleeve and the rotating sleeve to selectively prevent the rotating sleeve from rotating relative to the stationary sleeve. In particular, in one embodiment of the invention the lock spool 48 is non-rotatable but axially movable relative to the stationary sleeve 44. Thus, the lock spool 48 can be moved into engagement with the rotating sleeve 46 in order to couple the rotating sleeve to the stationary sleeve 44 and thereby prevent the support frame 14 from pivoting relative to the base frame 16. In addition, the lock spool 48 can be moved out of engagement with the rotating sleeve 46 in order to de-couple the rotating sleeve from the stationary sleeve 44 and thereby allow the support frame 14 to pivot relative to the base frame 16.

Figures 9, 10:
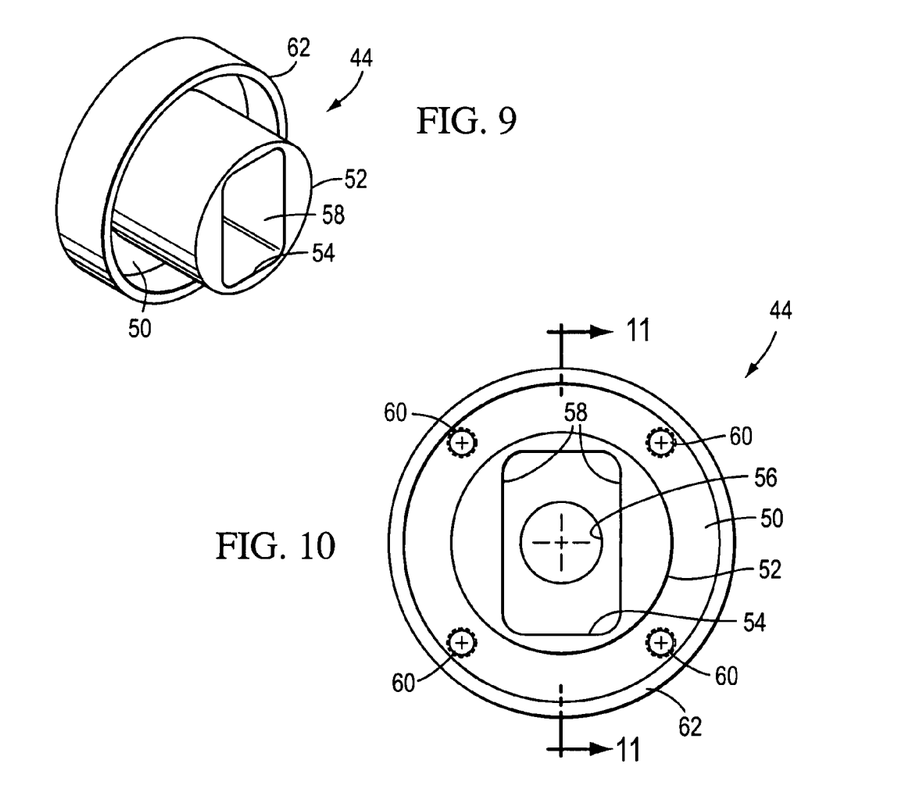
FIG. 9 is a perspective view of the stationary sleeve component of the locking hub of the present invention.
FIG. 10 is a front elevation view of the stationary sleeve shown in FIG. 9.
Figure 11:
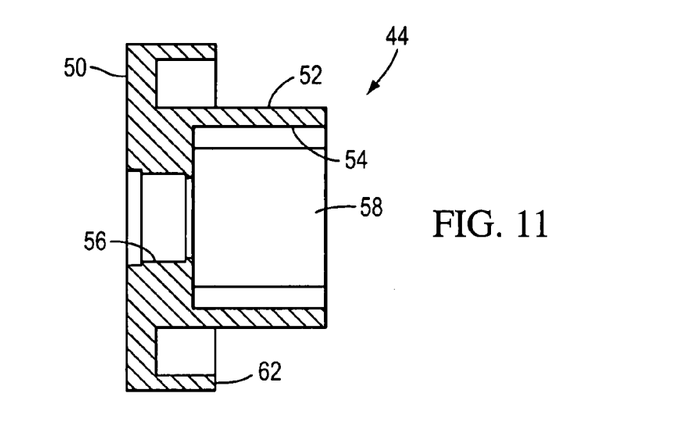
FIG. 11 is a cross sectional view of the stationary sleeve taken along line 11-11 of FIG. 10.

Referring to FIGS. 9 through 11, the stationary sleeve 44 includes a base portion 50, a cylindrical shaft portion 52 which extends transversely from the base portion, a cavity 54 which extends axially into an end of the shaft portion opposite the base portion, and a bore 56 which extends axially through the base portion and communicates with the cavity. The cavity 54 includes at least one and preferably two first contact surfaces 58 which are generally parallel to the axis of the shaft portion 52. In addition, for reasons which will be made apparent below, the stationary sleeve 44 may include a number of threaded holes 60 which are formed in the side of the base portion 50 opposite the shaft portion 52, and an annular lip 62 which extends axially from the periphery of the base portion 50 in the direction of the shaft portion 52.

Figure 12:
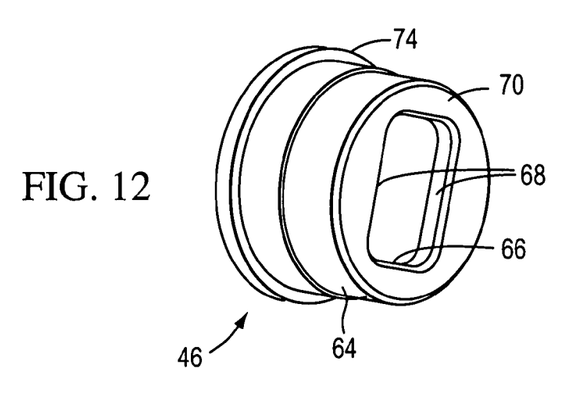
FIG. 12 is a perspective view of the rotating sleeve component of the locking hub of the present invention.
Figure 13:
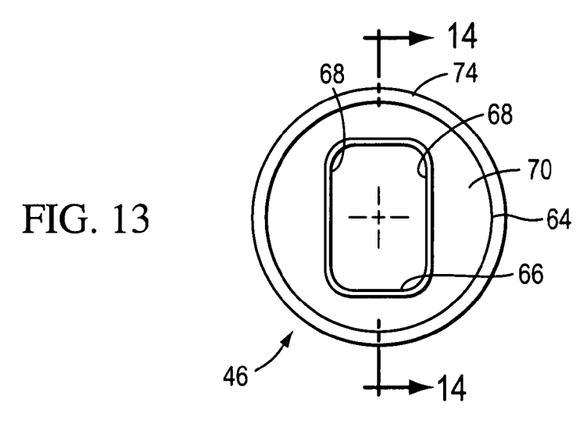
FIG. 13 is a front elevation view of the rotating sleeve shown in FIG. 12.
Figure 14:
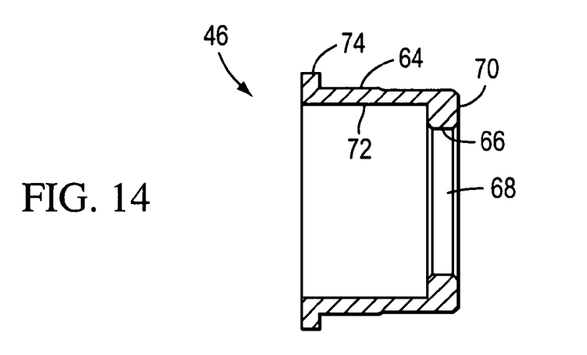
FIG. 14 is a cross sectional view of the rotating sleeve taken along line 14-14 of FIG. 13.

Referring to FIGS. 12 through 14, the rotating sleeve 46 comprises a cylindrical body portion 64, an axial bore 66 which is formed in an end 70 of the body portion, and a cylindrical recess 72 which is connected to the bore and within which the shaft portion 52 of the stationary sleeve 44 is rotatably received. The axial bore 66 includes at least one and preferably two second contact surfaces 68 which are generally parallel to the axis of the body portion. Thus, it should be apparent that, in the embodiment of the invention depicted in the Figures, the first contact surfaces 58 of the stationary sleeve 44 and the second contact surfaces 68 of the rotating sleeve 46 are both generally parallel to the rotational axis of the rotating sleeve. The body portion 64 may also include an annular lip 74 which extends radially outwardly from an end of the body portion opposite the end 70.

Figure 15:
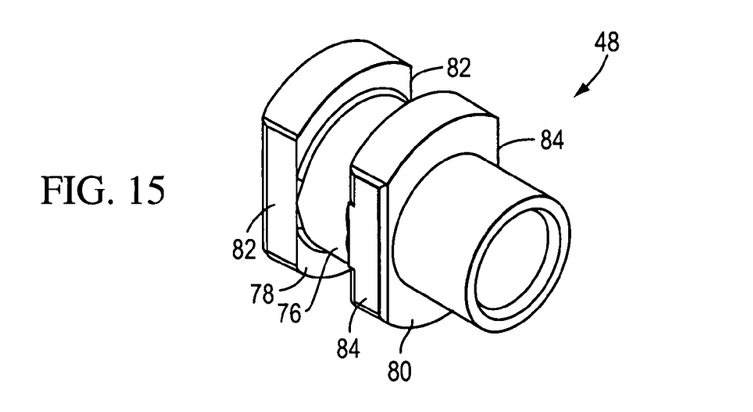
FIG. 15 is a perspective view of the lock spool component of the locking hub of the present invention.
Figure 16:
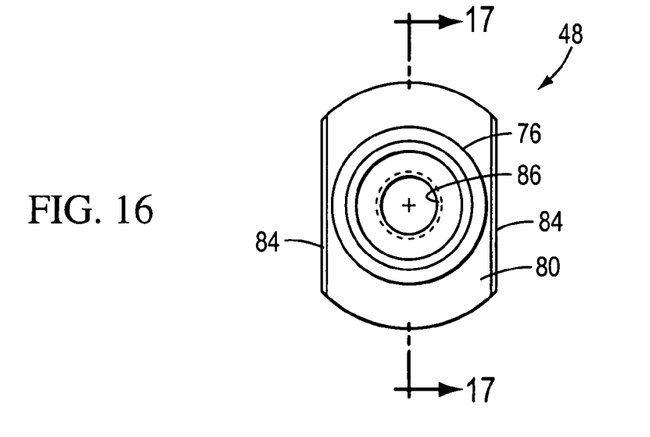
FIG. 16 is a front elevation view of the lock spool shown in FIG. 15.
Figure 17:
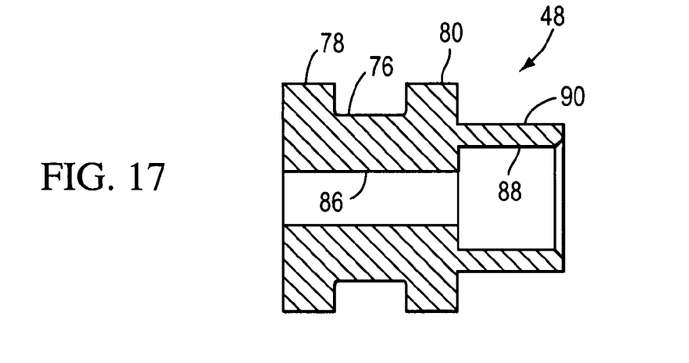
FIG. 17 is a cross sectional view of the lock spool taken along line 17-17 of FIG. 16.

Referring to FIGS. 15 through 17, the lock spool 48 includes a hub portion 76, a first key portion 78 which extends radially from one end of the hub portion and is configured to fit within the cavity 54 of the stationary sleeve 44, and a second key portion 80 which extends radially from the opposite end of the hub portion and is configured to fit within the bore 66 of the rotating sleeve 46. The first key portion 78 comprises at least one and preferably two first lock surfaces 82, each of which conforms to a corresponding first contact surface 58 of the stationary sleeve 44. Similarly, the second key portion 80 comprises at least one and preferably two second lock surfaces 84, each of which conforms to a corresponding second contact surface 68 of the rotating sleeve 46.

For purposes which will be made apparent below, the lock spool 48 ideally also includes an axial bore 86 proximate the first key portion 78 and an axial recess 88 proximate the second key portion 80. Although not necessary for purposes of the present invention, the axial recess 88 may be formed in an extension piece 90 which extends axially from the second key portion 80.

Figure 8:
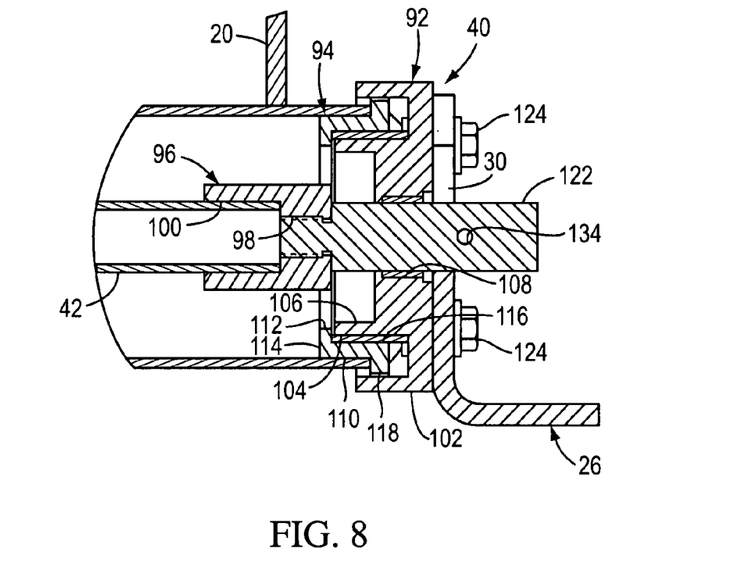
FIG. 8 is a cross sectional view of the non-locking hub component of the locking shaft assembly of the present invention.

Referring now to FIG. 8, the non-locking hub 40 includes a stationary sleeve 92, a rotating sleeve 94, and an coupling member 96 that includes an axial bore 98 and an axial recess 100. The stationary sleeve 92 is similar to the stationary sleeve 44 of the locking hub 38 in that it comprises a base portion 102, a cylindrical shaft portion 104 which extends axially from the base portion, a generally cylindrical cavity 106 which extends axially into an end of the shaft portion opposite the base portion, and a bore 108 which extends axially through the base portion and communicates with the cavity. Likewise, the rotating sleeve 94 is similar to the rotating sleeve 46 of the locking hub 38 in that it comprises a cylindrical body portion 110, an bore 112 which extends axially through an end 114 of the body portion, a cylindrical recess 116 which is connected to the bore and within which the shaft portion 104 is rotatably received, and an annular lip 118 which extends radially outwardly from the end of the body portion opposite the end 114. In contrast to the stationary sleeve 44 and the rotating sleeve 46 of the locking hub 38, however, the stationary sleeve 92 and the rotating sleeve 94 of the non-locking hub 40 do not include contact surfaces similar to the first and second contact surfaces 58 and 68. Consequently, the coupling member 96 will not interfere with the rotation of the rotating sleeve 94 during movement of the idler roller assembly 10 between its operative and inoperative positions.

One method of assembling the idler roller assembly 10 will now be described with reference to FIGS. 3, 4, 6 and 8. First, the rotating sleeve 46 of the locking hub 38 is secured to the support frame 14 by attaching the body portion 64 of the rotating sleeve to the support tube 18. This may be accomplished by, for example, press fitting the body portion 64 into one end of the support tube 18 until the annular lip 74 engages the end of the support tube. The rotating sleeve 94 of the non-locking hub 40 may be connected to the opposite end of the support tube 18 in a similar fashion.

Next, a first, preferably cylindrical strike shaft 120 is threaded into the bore 86 of the lock spool 48, and a second, preferably cylindrical strike shaft 122 is threaded into the bore 98 of the coupling member 96. One end of the connecting rod 42 is then inserted into the recess 88 in the lock spool 48, and the opposite end of the connecting rod is inserted into the recess 100 in the coupling 96. This entire assembly is then inserted into the support tube 18.

Following this step, the stationary sleeve 44 of the locking hub 38 is assembled with the rotating sleeve 46 of the locking hub by positioning the bore 56 of the stationary sleeve over the distal end of the first strike shaft 120 and then pressing the shaft portion 52 of the stationary sleeve into the cylindrical recess 72 of the rotating sleeve. The stationary sleeve 92 of the non-locking hub may be assembled with the rotating sleeve 94 of the non-locking hub in a similar manner. Next, the support frame 14 is lowered onto the base frame 16 until each of the first and second strike shafts 120, 122 is positioned in the vertical groove 30 in a corresponding mounting bracket 26. The stationary sleeves 44, 92 are then connected to their adjacent mounting brackets 26 using, for example, a number of bolts 124 which are inserted through corresponding bores in the upstanding part 28 of the mounting bracket and threaded into corresponding holes 60 in the base portions 50, 102 of the stationary sleeves.

As shown in FIGS. 3 and 6, a number of first bearing sleeves 126, in this case two, may be positioned between the shaft portion 52 of the stationary sleeve 44 and the cylindrical recess 72 of the rotating sleeve 46. Likewise, a number of second bearing sleeves 128, in this case one, may be positioned between the first strike shaft 120 and the bore 56 of the stationary sleeve. The first and second bearing sleeves 126, 128 will facilitate rotation of the rotating sleeve 46 relative to the stationary sleeve and translation of the first strike shaft 120 relative to the bore 56. As shown in FIGS. 3 and 8, the locking shaft assembly 36 may include similar components for the non-locking hub 40.

In addition, a first annular seal 130, such as an O-ring seal, may be positioned between the first strike shaft 120 and the bore 56, and a second annular seal 132, such as a V-seal, may be positioned between the stationary and rotating sleeves 44, 46. For example, the second seal 132 may be positioned between the base portion 50 of the stationary sleeve 44 and the end of the body portion 64 of the rotating sleeve 46 opposite the end 70. Moreover, the annular lip 62 of the stationary sleeve 44 ideally extends over the radial lip 74 of the rotating sleeve 46 in order to enclose the seal 132 within the locking hub 38. The annular seals 130, 132 function to prevent moisture and dust from entering the locking hub 38, an this reduces the need to perform maintenance on the locking shaft assembly. As shown in FIGS. 3 and 8, the locking shaft assembly 36 may include similar components for the non-locking hub 40.

The operation of the locking shaft assembly 36 will now be described with reference to FIGS. 6 and 7. In the operative position of the trippable idler roller assembly 10, the lock spool 48 is positioned as shown in FIG. 6 so that the first key portion 78 is within the cavity 54 of the stationary sleeve 44 and the second key portion 80 is within the bore 66 of the rotating sleeve 46. In this position, the first lock surfaces 82 of the first key portion 78 are in engagement with the first contact surfaces 58 of the cavity 54 and the second lock surfaces 84 of the second key portion 80 are in engagement with the second contact surfaces 68 of the bore 66. Consequently, the lock spool 48 will prevent the rotating sleeve 46 from rotating relative to the stationary sleeve 44. Moreover, since the stationary sleeve 44 is secured to the base frame 16 and the rotating sleeve 46 is secured to the support frame 14, the support frame will be unable to pivot relative to the base frame. In order to prevent the lock spool 48 from moving axially when the idler roller assembly 10 is in its operative position, the locking shaft assembly 36 may include a pair of locking pins (not shown), each of which is received in a corresponding hole 134 in a respective one of the first and second strike shafts 120, 122.

Figure 7:
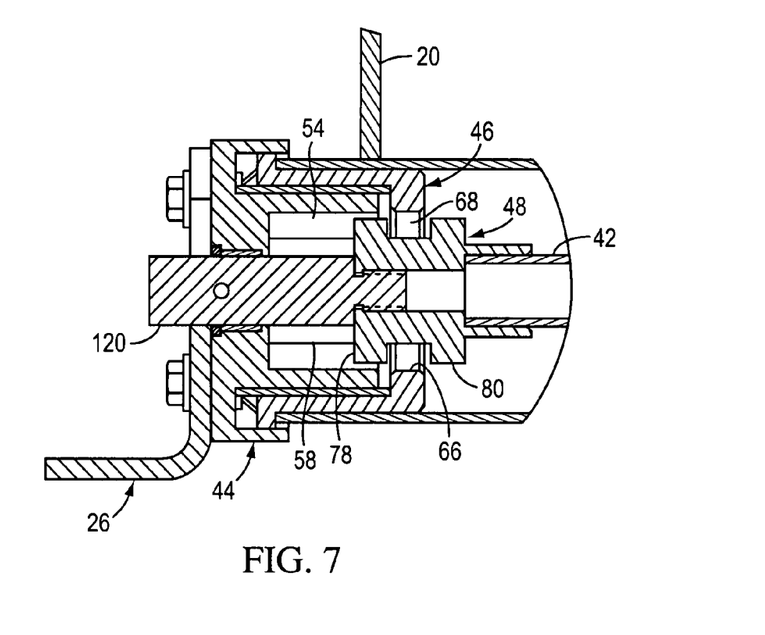
FIG. 7 is a cross sectional view of the locking hub shown in its unlocked position.

To move the trippable idler roller assembly 10 into one of its inoperative positions, the first strike shaft 120 is forced to the right to the position shown in FIG. 7. Alternatively, the second strike shaft 122, which is connected to the first strike shaft through the connecting rod 42, may be forced to the left. Either action will push the second key portion 80 of the lock spool 48 axially out of the bore 66 of the rotating sleeve 46. In this position, the second lock surfaces 84 of the second key portion 80 are no longer in engagement with the second contact surfaces 68 of the bore 66, and the rotating sleeve 46 is thus free to rotate relative to the stationary sleeve 44. As a result, the support frame 14 may be pivoted relative to the base frame 16 to thereby move the idler rollers 12 away from the conveyor belt.

Thus, during operation of the locking shaft assembly 36, the lock spool 48 is movable between a first position and either a second position or a third position. In the first position of the lock spool 48, the first lock surfaces 82 are engaged with the first contact surfaces 58 and the second lock surfaces 84 are engaged with the second contact surfaces 68. In this position, the angular position of the support frame 14 is fixed relative to the base frame 16. In the second and third positions of the lock spool 48, the first lock surfaces 82 are engaged with the first contact surfaces 58, but the second lock surfaces 84 are disengaged from the second contact surfaces 68. In these positions, the support frame 14 is allowed to pivot relative to the base frame 16 so that the idler roller assembly 10 can be placed in its inoperative position. During translation of the lock spool 48 into its second and third positions, rightward movement of the lock spool is limited by the engagement of the coupling member 96 with the stationary sleeve 92 of the non-locking hub 40, and leftward movement of the lock spool is limited by the engagement of the lock spool with the stationary sleeve 44 of the locking hub 38.

Also, when the lock spool 48 is in either of its second or third positions, the support frame 14 may be pivoted until the end brackets 20 are in contact with one of the beams 24 of the support frame 16. Thus, in the inoperative position of the idler roller assembly 10, the support frame 14 will nevertheless be supported relative to the base frame 16.

During the operation of the idler roller assembly 10, the non-locking hub 40 functions merely as a rotary bearing between its corresponding mounting bracket 26 and the support tube 18. In an alternative embodiment of the invention, however, the non-locking hub 40 may be replaced with a locking hub similar to the locking hub 38. In this embodiment, both ends of the support tube 18 will be positively locked to the mounting brackets 26 when the idler roller assembly 10 is in its operative position, but the operation of the idler roller assembly 10 is otherwise unchanged.

In an alternative embodiment of the invention, the stationary sleeve 44 and the rotating sleeve 46 may be configured such that the second contact surfaces 68 of the rotating sleeve are engaged with both the first and second lock surfaces 82, 84 of the lock spool 48 during each of the first, second and third positions of the lock spool. In this embodiment, the first contact surfaces 58 of the stationary sleeve 44 would be engaged with the first lock surfaces 82 only when the lock spool is in its first position. In this positions, the rotating sleeve 46 would be coupled to the stationary sleeve 44, and the support frame 14 would therefore be fixed relative to the base frame 16. In the second and third positions of the lock spool 48, however, the rotating sleeve 46 would be de-coupled from the stationary sleeve 44, and the support frame 14 would therefore be allowed to pivot relative to the base frame 16.

In a further embodiment of the invention, the first and second key portions 78, 80 may be omitted from the lock spool 48. In this embodiment, the lock spool 48 may comprise only the first lock surfaces 82. However, the first lock surfaces 82 would be axially extended so that, in the first position of the lock spool 48, the first lock surfaces would be engaged with both the first contact surfaces 58 of the stationary sleeve 44 and the second contact surfaces 68 of the rotating sleeve 46. As in the previous embodiment, however, in the second position of the lock spool 48 the first lock surfaces 82 would be engaged with the first contact surfaces 58 but disengaged from the second contact surfaces 68.

It should be recognized that, while the present invention has been described in relation to the preferred embodiments thereof, those skilled in the art may develop a wide variation of structural and operational details without departing from the principles of the invention. Therefore, the appended claims are to be construed to cover all equivalents falling within the true scope and spirit of the invention.

We claim:

1. An idler roller assembly which comprises:
   a base frame which includes first and second spaced-apart mounting brackets;
   a support frame for supporting a number of idler rollers in a belt conveyor system, the support frame including a support tube that comprises a first end which is positioned adjacent the first mounting bracket and a second end which is positioned adjacent the second mounting bracket;
   a locking shaft assembly which includes:
   a stationary sleeve which is secured to the first mounting bracket;
   a rotating sleeve which is rotatably supported by the stationary sleeve and is secured to the first end of the support tube;
   wherein the stationary sleeve comprises one of a first contact surface and a second contact surface and the rotating sleeve comprises the other of the first contact surface and the second contact surface;
   a lock spool which comprises a first lock surface which conforms to the first contact surface and a second lock surface which conforms to the second contact surface;
   wherein the lock spool is movable between a first position in which the first lock surface is engaged with the first contact surface and the second lock surface is engaged with the second contact surface to thereby prevent the rotating sleeve from rotating relative to the stationary sleeve, and a second position in which the first lock surface is engaged with the first contact surface but the second lock surface is disengaged from the second contact surface to thereby allow the rotating sleeve to rotate relative to the stationary sleeve;
   wherein in the first position of the lock spool the support frame is prevented from pivoting relative to the base frame, and in the second position of the lock spool the support frame is allowed to pivot relative the base frame.

2. The idler roller assembly of claim 1, wherein the first and second lock surfaces are located adjacent each other to thereby define a single lock surface which conforms to both the first and second contact surfaces.

3. The idler roller assembly of claim 1, wherein the first and second contact surfaces are generally parallel to a rotational axis of the rotating sleeve.

4. The idler roller assembly of claim 1, wherein the stationary sleeve comprises two first contact surfaces, the rotating sleeve comprises two second contact surfaces, the lock spool comprises two first lock surfaces which each conform to a respective one of the first contact surfaces, and the lock spool comprises two second lock surfaces which each conform to a respective one of the second contact surfaces.

5. The idler roller assembly of claim 1, wherein the stationary sleeve comprises the first contact surface and the rotating sleeve comprises the second contact surface.

6. The idler roller assembly of claim 5, wherein the stationary sleeve comprises a cavity within which the first contact surface is formed.

7. The idler roller assembly of claim 6, wherein the rotating sleeve comprises a bore within which the second contact surface is formed.

8. The idler roller assembly of claim 7, wherein the stationary sleeve comprises a cylindrical shaft portion within which the cavity is formed.

9. The idler roller assembly of claim 8, wherein the rotating sleeve comprises a cylindrical recess within which the shaft portion is rotatably received.

10. The idler roller assembly of claim 9, wherein the first and second contact surfaces are generally parallel to a rotational axis of the rotating sleeve.

11. The idler roller assembly of claim 7, wherein the first and second lock surfaces are located adjacent each other to thereby define a single lock surface which conforms to both the first and second contact surfaces.

12. The idler roller assembly of claim 7, wherein the cavity comprises two first contact surfaces, the bore comprises two second contact surfaces, the lock spool comprises two first lock surfaces which each conform to a respective one of the first contact surfaces, and the lock spool comprises two second lock surfaces which each conform to a respective one of the second contact surfaces.

13. The idler roller assembly of claim 1, further comprising means for moving the lock spool between its first and second positions.

14. The idler roller assembly of claim 13, wherein the moving means comprises a strike shaft which is connected to the lock spool.

15. An idler roller assembly for a belt conveyor which comprises a conveyor belt, the idler roller assembly comprising:
   a base frame which includes first and second spaced-apart mounting brackets;
   a support frame which includes a support tube that comprises a first end which is positioned adjacent the first mounting bracket and a second end which is positioned adjacent the second mounting bracket;
   a number of idler rollers which are mounted on the support frame;
   a locking shaft assembly which includes:
      a stationary sleeve which is secured to the first mounting bracket and includes a cylindrical shaft portion, an axial cavity which is formed in the shaft portion, and at least one first contact surface which is formed in the cavity;
      a rotating sleeve which is secured to the first end of the support tube and includes a cylindrical recess within which the shaft portion is rotatably received, an axial bore, and at least one second contact surface which is formed in the bore; and
      a lock spool which comprises at least one first lock surface which conforms to the first contact surface and at least one second lock surface which conforms to the second contact surface;
   wherein the lock spool is movable between a first position in which the first lock surface is engaged with the first contact surface and the second lock surface is engaged with the second contact surface to thereby prevent the rotating sleeve from rotating relative to the stationary sleeve, and a second position in which the first lock surface is engaged with the first contact surface but the second lock surface is disengaged from the second contact surface to thereby allow the rotating sleeve to rotate relative to the stationary sleeve;
   wherein in the first position of the lock spool the idler rollers are engaged with the conveyor belt and the support frame is prevented from pivoting relative to the base frame, and in the second position of the lock spool the support frame is allowed to pivot relative the base frame to thereby disengage the idler rollers from the belt.

16. The idler roller assembly of claim 15, wherein the first and second contact surfaces are generally parallel to a rotational axis of the rotating sleeve.

17. The idler roller assembly of claim 15, wherein the first and second lock surfaces are located adjacent each other to thereby define a single lock surface which conforms to both the first and second contact surfaces.

18. The idler roller assembly of claim 15, wherein the cavity comprises two first contact surfaces, the bore comprises two second contact surfaces, the lock spool comprises two first lock surfaces which each conform to a respective one of the first contact surfaces, and the lock spool comprises two second lock surfaces which each conform to a respective one of the second contact surfaces.

19. The idler roller assembly of claim 15, further comprising means for moving the lock spool between its first and second positions.

20. The idler roller assembly of claim 19, wherein the moving means comprises a strike shaft which extends through the stationary sleeve and is connected to the lock spool.

* * * * *